(12) United States Patent
Wik et al.

(10) Patent No.: US 10,750,671 B2
(45) Date of Patent: Aug. 25, 2020

(54) METHOD AND SYSTEM FOR GROWTH STATUS DETERMINATION OF A PLANT

(71) Applicant: Heliospectra AB, Gothenburg (SE)

(72) Inventors: Torsten Wik, Gothenburg (SE); Anna-Maria Carstensen, Jörlanda (SE); Tessa Pocock, Troy, NY (US)

(73) Assignee: Heliospectra AB, Gothenburg (SE)

( * ) Notice: Subject to any disclaimer, the term of this patent is extended or adjusted under 35 U.S.C. 154(b) by 423 days.

(21) Appl. No.: 15/541,575

(22) PCT Filed: Jan. 14, 2016

(86) PCT No.: PCT/EP2016/050622
§ 371 (c)(1),
(2) Date: Jul. 5, 2017

(87) PCT Pub. No.: WO2016/113330
PCT Pub. Date: Jun. 21, 2016

(65) Prior Publication Data
US 2017/0339839 A1    Nov. 30, 2017

(30) Foreign Application Priority Data
Jan. 14, 2015    (EP) .................................... 15151159

(51) Int. Cl.
| | | |
|---|---|---|
| *A01G 7/04* | (2006.01) | |
| *H05B 45/10* | (2020.01) | |
| *A01G 22/00* | (2018.01) | |

(52) U.S. Cl.
CPC ............. *A01G 7/045* (2013.01); *A01G 22/00* (2018.02); *H05B 45/10* (2020.01); *Y02P 60/146* (2015.11)

(58) Field of Classification Search
CPC ......... A01G 7/045; H05B 45/10; H05B 45/12
See application file for complete search history.

(56) References Cited

U.S. PATENT DOCUMENTS

| | | |
|---|---|---|
| 3,431,909 A | 3/1969 | Krusko |
| 3,628,534 A | 12/1971 | Donohue |
| (Continued) | | |

FOREIGN PATENT DOCUMENTS

| | | |
|---|---|---|
| CN | 101514963 A | 8/2009 |
| EP | 2 405 258 A2 | 1/2012 |
| (Continued) | | |

OTHER PUBLICATIONS

International Search Report and the Written Opinion of the International Searching Authority, PCT/EP2016/050622, "Method and System for Growth Status Determination of a Plant," dated Mar. 22, 2016.

(Continued)

*Primary Examiner* — Kristen C Hayes
(74) *Attorney, Agent, or Firm* — Hamilton, Brook, Smith & Reynolds, P.C.

(57) ABSTRACT

The present invention relates to a method for determining a growth status of a plant comprising chlorophyll, the method comprising the steps of: illuminating the plant (102) with input light including a light intensity modulation component (205, 206, 207, 208); detecting light emitted from the plant; determining (S702) an offset light intensity (204) surrounding the plant, the offset light intensity being a static component of the input light; determining (S718) a phase and a gain between the input light and the detected light, determining (S720) a growth status of the plant based on a predetermined relationship between input light and detected light, and on the phase and the gain. The invention also relates to a corresponding system and to a computer program product.

15 Claims, 7 Drawing Sheets

(56) References Cited

U.S. PATENT DOCUMENTS

| | | | |
|---|---|---|---|
| 8,384,047 B2* | 2/2013 | Shur | A01G 7/045 |
| | | | 250/458.1 |
| 2011/0147617 A1* | 6/2011 | Shur | A01G 7/045 |
| | | | 250/461.1 |
| 2012/0101462 A1 | 4/2012 | Lee | |
| 2016/0007424 A1* | 1/2016 | Maxik | H05B 45/22 |
| | | | 315/153 |
| 2017/0311553 A1* | 11/2017 | Dobrinsky | A01G 9/20 |
| 2019/0335675 A1* | 11/2019 | Ngo | A01G 9/249 |
| 2020/0068810 A1* | 3/2020 | Pahlevaninezhad | H05B 45/10 |
| 2020/0107504 A1* | 4/2020 | Bongartz | A01G 7/045 |

FOREIGN PATENT DOCUMENTS

| | | |
|---|---|---|
| EP | 2 710 883 A1 | 3/2014 |
| JP | 2002 153127 A | 5/2002 |
| JP | 2006-333744 | 12/2006 |
| WO | WO 2008/118080 A1 | 10/2008 |
| WO | 2014/044868 A1 | 3/2014 |
| WO | WO 2016/113330 | 7/2016 |

OTHER PUBLICATIONS

Strasser, R.J., "Analysis of the Chlorophyll a Fluorescence Transient", Chapter 12, George C. Papageorgiou & Govindjee (eds), Chlorophyll a Fluorescence: A Signature of Photosynthesis, pp. 321-362, (2004).

Prasad, Paras N., "Introduction to Biophotonics," Wiley-Interscience, pp. i-v, 109-114, 2003.

* cited by examiner

METHOD AND SYSTEM FOR GROWTH STATUS DETERMINATION OF A PLANT

This application is the U.S. National Stage of International Application No. PCT/EP2016/050622, filed Jan. 14, 2016, which designates the U.S., published in English, and claims priority under 35 U.S.C. §§ 119 or 365(c) to Europe Application No. 15151159.9, filed Jan. 14, 2015. The entire teachings of the above applications are incorporated herein by reference.

TECHNICAL FIELD

The present invention relates to a method and a system for determining a growth status of a plant comprising chlorophyll.

BACKGROUND OF THE INVENTION

Artificial and supplemental lighting in e.g. a greenhouse typically involves use of an illumination system for stimulating plant growth, the illumination system comprising a plurality of high power light sources. Different types of light sources, having different light spectrum and providing different effects on growth stimulation, may be included, such as light sources based on metal halide (MH) or high intensity discharge (HID) which includes high pressure sodium (HPS). Using metal halide based lighting typically promotes shorter, bushy growth; whereas high pressure sodium based lighting in comparison typically tends to produce taller and stretched plants. Thus, different types of light sources may lead to different end growth results of plants, which reflect a challenge in accurate control of the growth of plants with artificial lighting.

Recently, much progress has been made in increasing the brightness of light emitting diodes (LEDs). As a result, LEDs have become sufficiently bright and inexpensive to serve also for artificial lighting in e.g. a greenhouse environment, additionally providing the possibility of emitting light with adjustable light spectrum and intensity offset. By mixing differently colored LEDs and adjusting their individual intensity a desired light spectrum may be obtained. An adjustable lighting system typically comprises a number of primary colors, for example the three primaries red, green and blue. The light spectrum of the generated light is determined by the colors of the LEDs that are used, as well as by the mixing ratios of the intensities of light from LEDs of different colors. Thus, each LED of a LED based illumination system may be individually controlled such that a light spectrum of the overall emitted light may be conveniently adjusted. In addition, LEDs may switched on and off at a high rate and with a wide bandwidth providing the possibility of creating well defined light wave-forms and signals. Furthermore, by using LEDs it is possible to decrease the energy consumption, a requirement that is well in line with the current environmental trend. Additionally, using LED based illumination system minimizes the amount of light source generated heat which is particularly suitable in an environment where temperature control is desirable. An example of an LED based illumination system is disclosed in WO2008118080, comprising a light sensor communicatively coupled to a processor, where the processor implements a control algorithm for modulating and improving plant growth and attributes by adjusting the light spectrum emitted by the illumination system.

Document WO2008118080 shows a promising approach in relation to artificial lighting in a greenhouse environment. However, it would still be desirable to further optimize the artificial lighting systems, to be able to improve the growth process of a plant, specifically improving the diagnosis of plants and accuracy in the determination of growth status for plants arranged in a greenhouse environment. For example, it would be desirable to reduce the importance of the absolute levels of detected light emitted from the plant, e.g. fluorescence signals, for determining a plant growth status. This may, for example, reduce the impact of the distance from the plant to a sensor, or impact of the leaf area on the determination.

Other examples of known techniques include FLIDAR, t-LIDAR, and the JIP test. These techniques suffer from at least some of the above drawbacks. Furthermore, these techniques typically rely on evaluating a transient response of the plant starting from a dark adapted state which makes the evaluation rather complicated for field testing and unsuitable for green house applications. An example of such technique is disclosed in STRASSER et al. 'Analysis of the chlorophyll a fluorescence transient', in: *Advances in photosynthesis and respiration*, 2004, Vol. 19, pages 321-362, ISSN 1572-0233. However, in accordance with the above, it would be desirable to further improve growth status evaluation, and in particular reduce the impact of the environment where the evaluations are performed.

SUMMARY OF THE INVENTION

According to a first aspect of the invention, the above is at least partly alleviated by a method for determining a growth status of a plant comprising chlorophyll, the method comprising the steps of:
    illuminating the plant with input light including a light intensity modulation component;
    detecting light emitted from the plant;
    determining an offset light intensity surrounding the plant, the offset light intensity being a static component of the input light;
    determining a phase and a gain between the input light and the detected light,
    determining a growth status of the plant based on a predetermined relationship between input light and detected light, and on the phase and the gain.

The present invention is based on the realization that the dynamics of induced fluorescence may provide information of the growth status of the plant. Furthermore, the dynamics may be studied in relation to an input-output functionality. It is also realized that the dynamics in the plant in relation to fluorescence is highly non-linear but may be described by a linear model during certain circumstances, in particular if the input light is modulated relative an offset light intensity.

It is realized that the dynamics of the fluorescence from the plant may be described as a buffer system comprising a number of buffers storing compounds in the different part of the photosynthetic process of the plant. When the plant is illuminated, the buffers will start to fill, while at the same time, as energy is being used by the photosynthesis buffers are being drained. Furthermore, several such buffers may be assumed to be interconnected forming a highly non-linear system. If the input is changed, in other words, if the input light is changed, a variation in the input energy in to the buffer system is present. If the buffers are not full and the input is changed the buffers will be subject to transient responses before they settle. However, if the buffers are full or empty and the input is changed the dynamics are different and the transient responses will at least partly be suppressed. The offset light intensity will basically determine the level of energy in the buffers. The dynamics (i.e. time constants) of the buffer system is generally faster with a higher offset light intensity and slower with a lower offset light intensity. However, if the buffers are full, there is reduced or no capacity of the buffer and therefore the dynamics of the buffer system is highly reduced when subjected to changed input light (energy). Thus, if one or more of the buffers are full, the system looses dynamic states and therefore the complexity of the system is reduced. The type of buffer system may in principle be described as a filter having a filter order.

The input light that reaches the plant will thus include a (preferably non-zero) static component in the form of an offset light intensity, and a modulation component in the form of a modulated intensity. The non-zero offset light intensity is at a high enough intensity level to at least induce photosynthetic activity in the plant. Thus, the offset light intensity may be such that the plants may be grown in normal light conditions. If the offset light intensity does not induce photosynthetic activity in the plant, it is considered to be at zero intensity. Such offset light intensity which does not induce photosynthetic activity in the plant may be different depending on the plant, but may for example be 1 µE, 20 µE, 30 µE, 40 µE, or 50 µE.

It should be understood that the static component and the modulation component may both originate from the same light source, or the static component may be the combination of ambient light and artificial light. Thus, the determined offset light intensity may be any light (ambient in combination with any offset from artificial light) which surrounds the plants. Furthermore, determining an offset light intensity surrounding the plant may comprise determining the offset light intensity in individual frequency ranges (thus intensity versus frequency), or the overall offset light intensity.

Both the offset light intensity and the modulated intensity may have a spectral distribution. The offset light intensity may be evenly distributed over the spectrum, or the offset light intensity may have different intensity at different wavelengths of the spectrum. For example, offset light intensity at a first wavelength may have intensity different from the offset light intensity at a second wavelength. Furthermore, the light intensity modulation of the input light may similarly be evenly distributed over the spectrum, or have different amplitude at different wavelengths. Furthermore, the spectrum of the modulated light intensity may range over e.g. blue light, red light, or other sub-ranges of the visual spectrum. It should be understood that a "spectrum" herein is the light intensity versus wavelength.

The detected light emitted from the plant comprises fluorescence light from the plant, or alternatively, only fluorescence light from the plant.

According to an embodiment, the step of determining the offset light intensity may comprises at least one of: measuring the offset light intensity; controlling the offset light intensity by controlling artificial light emitted by light emitting devices; and determining a growth status of the plant and, associating the determined growth status with a predefined offset light intensity. Thus, the offset light intensity may be determined by measuring the light surrounding the plant, or by controlling the light in the vicinity of the plants to a desired offset light intensity. Furthermore, the offset light intensity may be determined by first determining a growth status of the plant, and associating the determined growth status with a predetermined offset light intensity corresponding to the determined growth status.

The light intensity modulation component may be a cyclic modulation signal having a repetition frequency. In other words, the intensity modulation may be repeated at a known rate. By repeating the light intensity modulation with a repetition frequency, a measurement of stationary behavior rather than transient behavior can be determined. For example, if the offset light intensity is changed to a new level, the plant may be in the process of acclimatizing to the new offset light intensity, by repeatedly subject the plant to the modulated light intensity and measure the response from the plant, the plant may eventually reach a stationary state, thus a growth status in a stationary state rather than a transient behavior may be determined.

The spectral distribution for the light intensity modulation component may be selected based on a spectral distribution of the offset light intensity. Thus, in order to obtain a desired spectral distribution of the modulated light, the spectral distribution of the offset light component is taken into account and thereby may be compensated for. Furthermore, a spectral distribution of the modulation component and/or a spectral distribution of the static component may exclude a fluorescence wavelength of the plant. This way, noise from the input light in the detected fluorescence light may be reduced.

According to an embodiment, the predetermined relationship is a transfer function comprising a set of transfer function parameters, determined by the steps of: illuminating the plant with input light having a light intensity modulation component having multiple modulation frequencies; detecting light emitted from the plant; determining the set of transfer function parameters using a system identification method. It is realized that, as a consequence of the non-linearity of the plant dynamics, depending on characteristics of the above discussed input light the transfer function parameters may be different. For example, depending on the offset light intensity and its spectral distribution, or depending on the same properties (intensity and its spectral distribution) of the light intensity modulation different transfer function parameters may be found. As a further example, if the offset light intensity is evenly distributed across the spectrum and at a first intensity offset, a first set of transfer function parameters may be determined. If the offset light intensity is evenly distributed across the light spectrum and at a second intensity offset, a second set of transfer function parameters may be determined different from the first set. Furthermore, the transfer function parameters may also be different depending on if the offset light intensity has different intensity at different wavelengths of the spectrum.

It is realized that the state of the above buffer system may be probed by having previous knowledge of a transfer function between input light and detected light. The transfer function may be based on a linear model which describes one or more states of the buffer system related to the status of the plant. The transfer function may for example be established at a certain offset light intensity setting for known growth statuses of the plant. If the plant is later on probed with an input light intensity modulation, the response for the modulated frequency may be compared with the known transfer function for the light intensity modulation and the known offset light intensity. This evaluation provides information regarding the growth status of the plant. Thus, a set of transfer functions may be determined prior to evaluation of the plants growth status. The set of transfer functions may provide a mapping of the different light settings (spectrum, intensity, modulation, acclimatization) and response from the plant in different growth statuses. With this prior knowledge, the plant growth status may be determined from several types of input lights ranging from a single frequency modulation to a broad band modulation.

It should be noted that the light intensity modulation of the input light should be kept large enough to induce a measureable response from the plant, but small enough not to cause the plant to deviate from being possible to model by a linear model.

Furthermore, the light intensity modulation component has multiple modulation frequencies, the method further comprising determining a detected transfer function between the input light and the detected light comprising transfer function parameters, wherein the phase and the gain are determined from the detected transfer function. A multiple frequency signal may for example be one of a step pulse, a PRBS (pseudorandom binary sequence) signal, and a square-wave. However, the input light may comprise any arbitrary wave form having a specific range of frequency components and may also have a specific phase. The light intensity modulation component may be a modulation signal with frequency content in the range of 0.001-100 rad/s or even higher such as up to 1000 rad/s. As an example, if the input light is modulated as a square wave, the input light intensity (offset light in combination with light intensity modulation) is varied between two main levels of light intensity. This type of modulation causes a repeating input light in the form of a step function, thereby repeatedly inducing a step-response from the plants allowing for analysis of the dynamics fluorescence transients.

With reference to the types of modulation signals for the input light modulation, depending on the form of the modulation signal, i.e. the type of modulation the transfer function parameters may be different. For example, the transfer function parameters determined for a modulation signal being a step-up may be different from the transfer function parameters determined for a modulation signal being a step-down. Thus, depending on from which side of a square pulse (rising or falling edge) the transfer function parameters are determined, the transfer function parameters may be different. Furthermore, the determined transfer function parameters may also be different depending on the frequency content of the modulation of the modulation signal e.g. on the band width of the modulation. As previously described, the transfer function parameters may also be different depending on the spectrum of the input light being modulated. The above behavior related to the different input light behavior resulting in different transfer functions is a further indication of an underlying non-linear system that may describe the plant fluorescence response.

The modulation signal of the light intensity modulation component may comprise a sine signal with at least one modulation frequency. The modulation signal may for example be a convolution of several frequencies, a frequency sweep, or a single frequency.

The input light may comprise an offset static light intensity, and a light intensity modulation. It should be noted that the offset light intensity is advantageously well-defined and known before execution of the method. The light intensity modulation is modulated such that the total input light is modulated centered or add on to the offset light intensity level. For example, if the offset light level intensity is X and the light intensity modulation has an amplitude of Y, then the overall light intensity varies over time with the modulation characteristics (e.g. frequency, duty cycle, etc) from X to X+Y. The offset light intensity may be regarded as being caused by a DC-current component applied to light-emitting devices emitting the input light. Furthermore, there may be ambient light in the surrounding of the plants also contributing to the offset light. The method may advantageously take this into account and there is no need to black out the ambient light.

According to one embodiment of the invention, the step of determining the growth status comprises determining a change of the parameter values compared to parameter values of the predetermined transfer function, wherein the change is indicative of the level of stress in the plant.

Thus, the status of the plants may be studied by relating a change in parameter values to a growth status. Analogously to determining a parameter, zeros and poles of the transfer functions may be studied. Accordingly, the predetermined and the detected transfer function each comprises at least one pole and at least one zero.

Generally, poles and/or zeroes of a function may provide information regarding dynamics of the function. In this case, the number of poles and/or zeros may for example be indicative of the growth status of the plant. In order to find the poles and/or zeros, a model transfer function may be assumed, and then one fits transfer function output data to measured data. Different transfer functions may be suitable for plants grown under different light conditions.

As an example, determining a change in position of the poles and/or the zeroes may be used, wherein the change in position is indicative of the level of stress in the plant. Furthermore, a relative difference between positions of zeros of poles may be determined. For example, if a change in position is a first change in position, the method may comprise determining a second change in position of the poles and/or zeroes from a second determination of poles and/or zeros; and determining a relative difference between the first change in position and the second change in position.

It may further be advantageous to determine a change in position of the poles and/or the zeroes with changed light intensity of the input light, wherein the change in position is indicative of the level of light acclimatization of the plant.

In addition, the method may comprise changing a light spectrum of the input light, and determining a change in position of the poles and/or the zeroes resulting from the changed light spectrum of input light, wherein the change in position is indicative of the improved light spectrum for the plant.

The transfer function may be regarded into the frequency domain. An advantage of studying the transfer function in the frequency domain is that the impact of the order of the model is reduced thereby further improving the accuracy of the method. In the frequency domain, the fluorescence dynamics may be studied in a facilitated manner.

The level of stress in the plant may be determined from a shift of the transfer function in the frequency domain, wherein a shift to a frequency higher than an initial frequency indicates an increased level of stress. Thus, the increased level of stress is determined in a facilitated manner by studying the change of the transfer function in the frequency domain. The shift of the transfer function may be determined by studying the magnitude and/or the phase of the transfer function in the frequency domain.

Based on the determined growth status and on a desired growth status for the plant, a property of the input light may be controlled in order to modulate the growth of the plant towards the desired growth status.

The offset light intensity may be increased or decreased depending on the determined phase and/or gain between the input light and the detected light. The offset light intensity may be modulated such that the phase or the gain is modulated. Properties of the phase or the gain may provide information related to the growth status of the plant, for example whether the plant is stressed. The properties may for example be related to a shift of the phase or gain in the frequency domain (e.g. a frequency function of the phase or gain) to higher frequencies which may be an indication that the plant is more stressed compared to when the phase or gain in the frequency domain is at lower frequencies.

Whether the offset light intensity is determined to be increased or decreased also depends on previous data (e.g. the predetermined relationship) relating to the plant. For example, for a certain plant in certain offset light intensity, an increased phase at a certain frequency may be an indication that the offset light intensity should be decreased. For another type of plant in a certain offset light intensity, a shift of the phase in a direction (to higher frequency) in the frequency domain or an increased phase at a certain frequency may be an indication that the offset light intensity should be increased or decreased in order to reduce stress of the plant. As a further example, if the phase has decreased at a certain frequency or shifted to lower frequencies it may be determined to decrease/increase the offset light intensity in order to modulate the growth of the plant. If the phase is determined to be higher than a predetermined phase value at a certain frequency, it may be determined to decrease the offset light intensity in order to reduce stress.

Furthermore, a change in the gain may also be used for determining whether the offset light intensity should be changed or not. For example, an increase in gain may be in indication to increase/decrease the offset light intensity, or a decrease in gain may be in indication to increase/decrease the offset light intensity.

The wavelength range of the input light may be different from the chlorophyll fluorescence wavelength ranges of the plant.

The detected light may be chlorophyll fluorescence light from the plant. The input light may further comprise excitation light inducing the chlorophyll fluorescence in the plant and light for modulating growth of the plant.

According to an embodiment of the invention, the method may further comprise an initial step of determining a set of transfer functions for mapping growth status and input light settings. Thus, prior to determining the growth status of the plant, there has been mapped a set of transfer functions for known growth statuses and light settings such as spectrum and intensity of the offset light, and light intensity and properties of the modulation signal, etc.

A "growth status" (e.g. desired growth status or current growth status) may be defined as the property value(s) of at least one detectable property indicative of the status of the plant. Such properties may include plant height/width, stem size, growth rate, stress, properties of light reflectance, properties of fluorescence, weight, consumption of $CO_2$, water or nutrition, plant color, size of leaves, size of flowers, number of leaves, flowers, fruits or seeds, occasions when the flowers have been exposed to pollinating insects, time in the current growth state, etc. Light reflectance is properties of light emitted by a light-emitting device and reflected by the plant. Moreover, properties of fluorescence are properties of fluorescent light from the plants, such as chlorophyll fluorescent light.

The plants may be arranged in a controlled environment. The expression "controlled environment" should be interpreted broadly, including for example a greenhouse, a growing cabinet, or similar controlled growth environment where the plants may be subject to at least illumination of natural light. The controlled environment is thus typically an "indoor environment" comprising a transparent window or similar for allowing the natural light (such as sun) to be received by the plants. It is important to note that the "controlled" environment will never by fully controlled. To begin with, the contributions from natural light and outside temperature will vary. Also, the processes that are "controlled" will inevitably include factors outside the control of the users, including seed quality, diseases, human error, etc. However, the invention is equally applicable to plants grown in environments where they are substantially exposed to ambient light such as sun light. Thus, the offset light intensity may comprise the ambient light and light from artificial lighting, for example the offset light component of the input light or any other artificial light source. In addition, the invention may be applicable even if the entire offset light originates from ambient light and the only artificial light being the light intensity modulation.

According to second aspect of the present invention there is provided a system for determining the growth status of a plant, the system comprising:
  at least one light emitting device arranged to emit light towards the plant,
  at least one light sensor for detecting light emitted from the plant, and
  means for determining an offset light intensity surrounding the plant, the offset light intensity including artificial light and any ambient light;
  a control unit arranged to control the at least one light emitting device, and to receive information related to the detected light from the at least one light sensor, wherein the control unit is configured to:
control the at least one light emitting device to emit a light intensity modulation component which, together with the offset light intensity forms an input light;
determine a phase and a gain between the input light and the detected light, and
determine a growth status of the plant based on a predetermined relationship between input light and detected light and on the phase and the gain.

According to an embodiment of the invention, the control unit is further configured to: based on the determined growth status and on a desired growth status for the plant, control the at least one light-emitting device to emit light with a property to modulate the growth of the plant towards the desired growth status.

Further effects and features of this second aspect of the present invention are largely analogous to those described above in connection with the first aspect of the invention.

According to a third aspect of the present invention there is provided a greenhouse system comprising: a plurality of light-emitting devices, the light-emitting devices being arranged to emit light towards plants arranged in a greenhouse for stimulating growth of the plants, and a system according to the previous aspect.

Further effects and features of this third aspect of the present invention are largely analogous to those described above in connection with the previous aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
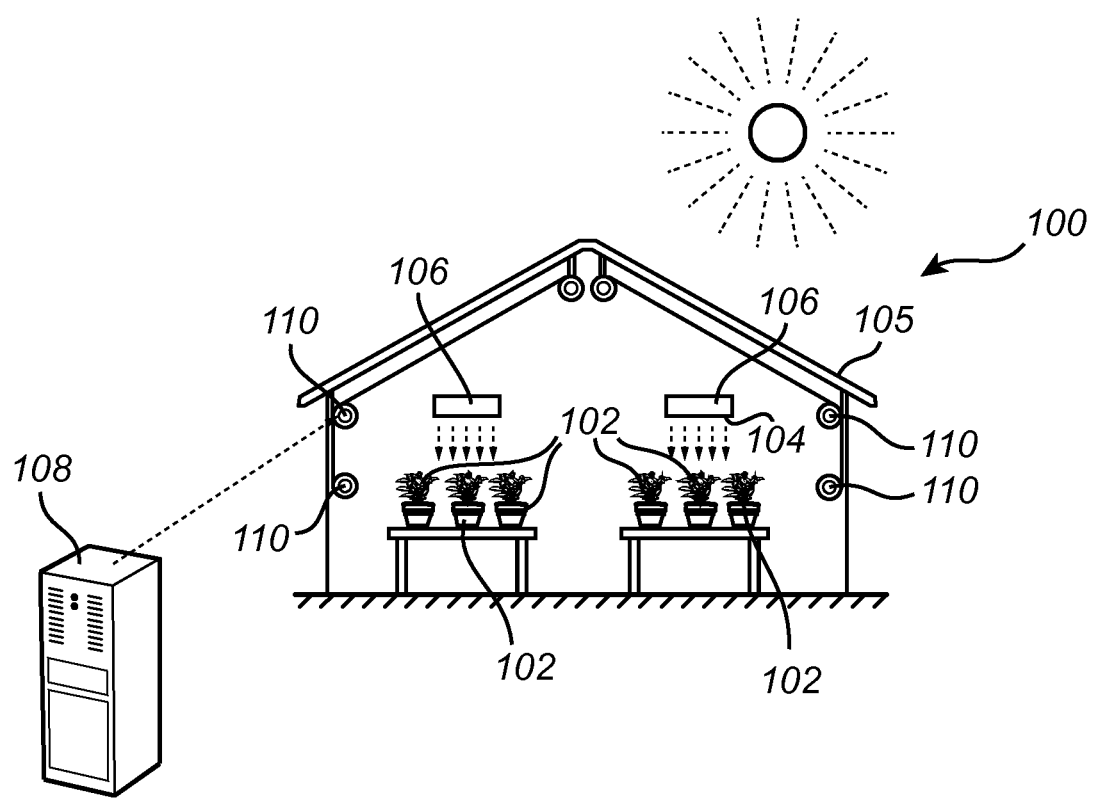
FIG. 1 shows an exemplary application of exemplary embodiments of the invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to FIG. 1 in particular, there is depicted a system 100 according to a possible embodiment of the invention. FIG. 1 shows a plurality of plants 102, arranged in an at least partly controlled environment in the form of a greenhouse 105 typically having walls and its roof constructed of transparent structures such as of glass and/or some suitable plastic material for allowing natural light from the sun to enter the inside of the greenhouse 105. The plants may of course be any type of plants such as e.g. herbs, medicinal plants, ornamental and general crops, etc. Furthermore, the controlled environment could of course be one of a walk-in chamber or a growth cabinet depending on the type of implementation of the inventive concept. In the greenhouse 105, there is an artificial light arrangement 106 electrically connected to a control unit 108. The artificial light arrangement 106 comprises suitable artificial light sources, e.g. light-emitting diodes (LEDs) 104, and is arranged such that light emitted by the light emitting devices 104 is received by the plants 102. The plurality of light emitting devices 104 may be configured to emit light of different wavelengths and may be individually controlled. The wavelength ranges may range from ultra-violet to infra-red in more than one range. For example, the ranges may be similar ranges for the sensors described below.

In order to effectively control the growth, a plurality of sensors 110 is arranged in or around the greenhouse 105. Such sensors may for example be configured to determine one or several conditions for the plants 102, as well as for determining current values of detectable properties of the plants, thereby determining current growth status of the plants. The sensors may for example include sensors for measuring air/soil temperature, moisture, humidity, carbon dioxide, air pressure, fertilizer levels, and/or image capturing devices (e.g. cameras) to be used for determining a growth status for the plant 102. As an alternative, or complement, to the sensors 110, there may be provided one or several manual interfaces, allowing manual input of various property values. The sensors 110 may further be light sensors 110 for detecting fluorescence light emitted from the plants 102.

In addition, the greenhouse 105 may comprise controllable heating elements (not shown) as well as windows (and similar controllable ventilation arrangements) (not shown) connected to the control unit 108 for controlling the temperature within the greenhouse 104, also being dependent on a desired temperature fluctuation for the plant 102 during its growth cycle. The location of the sensors 110 are merely for illustrative purposes and not necessarily accurate. Thus, the sensors 110 may be located where most appropriate depending on the type of sensor.

In an exemplary embodiment, the light-emitting device 104 illuminates the plants. At least part of the emitted light is reflected by the plant 102 and detected by at least one light sensor (e.g. sensor 110). The light sensor 110 further detects fluorescent light from the plants 102, such as chlorophyll fluorescent light. The response of the plant subjected to input light may be evaluated in terms of gain and phase. For example, if the input light has a sinusoidal intensity modulation at a single frequency, a phase and a gain of the detected light with respect to the input light may be determined at the same frequency. Furthermore, some of the light sensors 110 measure the offset light intensity and/or spectrum in the greenhouse 105. The offset light intensity may be a combination of artificial and ambient light. The light sensors 110 may be configured to measure light intensity in different wavelength ranges such as: 400 nm-630 nm, 630 nm-700 nm, 700 nm-740 nm, 750 nm-850 nm, 850 nm-1400 nm, or 400 nm-700 nm.

The processor may determine a transfer function between input light illuminating the plant and the detected light. The transfer function comprises a set of transfer function parameters which may be analyzed for determining the growth status of the plants 102. The light detected by the light sensor 110 may be analyzed by the processor for determining at least one growth property. The processor may determine to, depending on properties of the transfer function, modulate the light emitted by the light-emitting diodes, for example by adjusting the intensity or the spectral composition of the emitted light, in order to modulate or improve the growth of the plants 102. Furthermore, the transfer function may be predetermined by the control unit 108 and used at a later stage. For example, if the transfer function is known for certain offset light intensity/spectrum, a light intensity modulation added to the offset light according to a modulation signal may be used to determine the growth status. Thus, from the known light intensity modulation, the known offset light, a modulation signal, and a predetermined transfer function for the light intensity modulation, offset light and modulation signal, the detected light may be compared with an expected detected light related to the growth status and the predetermined transfer function. If the detected and the expected light agree, the growth status of the light is determined. The growth status determination will be described in more detail with reference to proceeding drawings.

Each plant is described by its growth status, comprising property value(s) for a set of detectable properties. Such properties may include plant height/width, stem size, growth rate, stress, properties of light reflectance, properties of fluorescence, weight, consumption of CO2, water or nutrition, plant color, size of leaves, size of flowers, number of leaves, flowers, fruits or seeds, occasions when the flowers have been exposed to pollinating insects, time in the current growth state, etc.

Figure 2A:
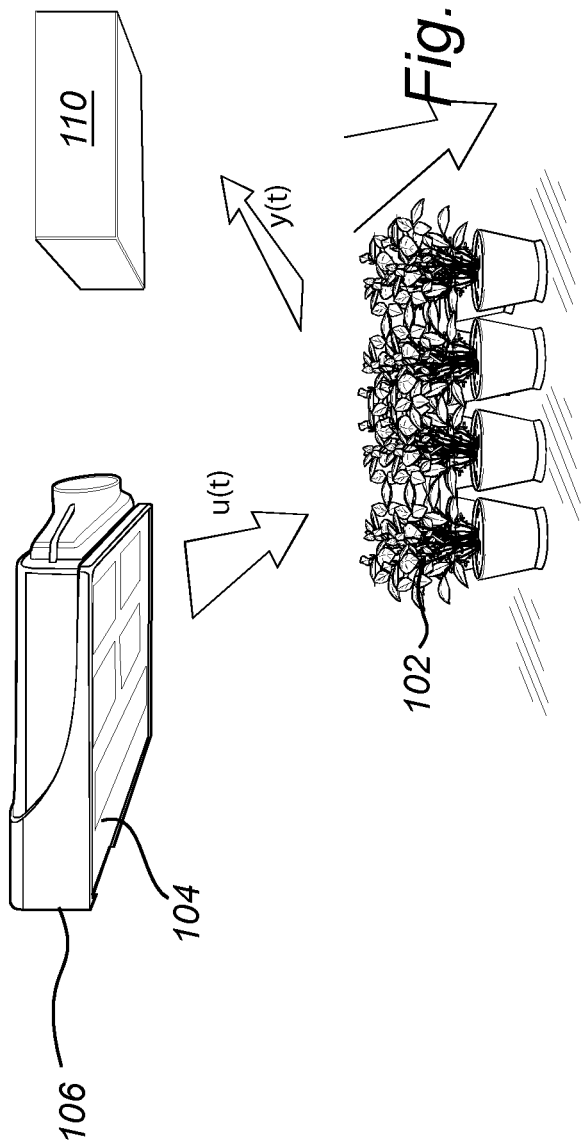
FIG. 2*a* schematically illustrates an exemplary embodiment of the invention.

FIG. 2a illustrates a system similar to what is shown in FIG. 1. In FIG. 2a, a plant 102 is illuminated with light by a light emitting device 104 arranged in the light emitting arrangement 106. There may further be ambient light such as e.g. sun light illumination the plant 102. Thus the light u(t) illuminating the plant 102 may comprise contributions from both ambient light, and artificial light emitted by the light emitting device 104. Note that the light emitting arrangement 106 may comprise a plurality of light emitting devices (e.g. light emitting diodes) which may be individually controlled. There may be light emitting diodes emitting light in the wavelength ranges from ultra-violet (e.g. 10 nm-400 nm) to infra red (at least 700 nm, e.g. 700 nm-1500 nm) Light y(t) emitted from the plant is detected by the light sensor 110. FIG. 2b illustrates an intensity variation of input light irradiating the plant 102. The light illuminating the plant 102 comprises an offset light intensity 204 and a light intensity modulation 205 added to the offset light intensity 204. The offset light intensity may for example comprise light from the sun or artificial light from light emitting devices 104 or a combination thereof. Thus, offset light intensity 204 may comprise ambient light and artificial light with a light spectrum, and in addition there is a light intensity modulation 205 added to the offset 204. Note that a specific offset light intensity with a specific spectrum may be created by the system 100. For example, the light sensor 110 may detect the offset light, and the light emitting devices 104 may emit light calculated by the control unit in order to obtain the desired offset light intensity and spectrum.

Due to the non-linear behavior of the plant, it may be relevant to know the offset intensity and the spectrum of the offset light, the amplitude of the modulated light and the spectrum of the modulated light, and the phase, amplitude and the modulation signal. The spectrum of the offset light relates to the intensity of the light over the spectrum. In particular in order to have knowledge about in which of the above light settings a linear model is valid. Thus, the invention involves determining a set of transfer functions for the above different light settings (offset light intensity/spectrum, light intensity modulation amplitude/spectrum and characteristics of the modulation signal such as amplitude/spectrum, signal form and also the detected phase of the signal form). For example, a plant may be exposed and acclimatized to specific light intensities and the transfer function may be determined for each of the light intensities. Or, as a further example, the transfer function may be determined for different offset light spectrums. Thus, transfer functions may be determined for different growth statuses, light setting, and/or growth states. Thereby, a set of transfer functions may be used to map the different light settings and growth statuses in different growth states of the growth cycle. A growth state may be e.g. a "nursery state" where the plants may grow to a certain size, a "growing state", a "flowering state" where flowers of a certain quality develops, a "maturing state" where e.g. a fruit is ripening, a "finish state", representing the completion of the desired product, a "recovery state" where a stressed plant may be recovered, and a "termination state" where a growth cycle for plant, which may not recovered and/or is not economically favorable, is terminated. Furthermore, the light sensors 110 may continuously detect the light intensity which the plants are subjected to in order to have information about the light intensity and spectrum that the plants were exposed to prior to growth status determination using modulated light intensity. This way, a more accurate determination may be done with a more in-depth analysis of the plant growth status.

Furthermore, the system is configured to adapt the emitted light from the light emitting device 104 based on for example variations in the ambient light. Thus, the method and system works in ambient light and there is no need to black out the location of the plants for a measurement. However, the system may be used for controlling the amount of ambient light (e.g. from the sun) that reaches the plant by controlling curtains of the greenhouse or similar means for blocking ambient light. As illustrated in FIG. 2b, the light intensity modulation about the offset light intensity 204 may be a cyclic modulation such as a square-wave modulation. Thus, in each period of the square wave 203, a step response from the plant is induced and may be used in determining a transfer function. However, only a single step-response may be used although in order to improve the signal to noise a square-wave may be advantageous.

As described in FIG. 2b, the light irradiating the plant 102 has an offset light intensity 204 with a known intensity (e.g. from measurements), a superimposed light intensity modulation in the form a step-up 207 or step-down 208 which may be part of a square wave 203 light intensity modulation signal. The amplitude of the light intensity modulation of the step-up 207 or step-down 208 is known. The variation of light intensity from the offset intensity caused by the step-up 207 or step-down 208 may be in the order of about for example 5% to 30% of the offset light intensity 204. Alternatively or additionally, the variation of intensity from the offset intensity caused by light intensity modulation, the step-up 207 or step-down 208 may be such that a certain offset light intensity is not exceeded, for example the offset light intensity not to exceed may be 500 µE, 700 µE, 1000 µE, 1200 µE, or 1500 µE. The step size (i.e. amplitude) of the light intensity modulation is a trade-off between obtaining a measureable response from the plant, and ensuring that the response can be modeled by a linear model and such that the plant dynamics remain within the same transfer function. With a step function (e.g. rise 207 or fall 208) the frequency content of the step function is known.

Figure 2C:
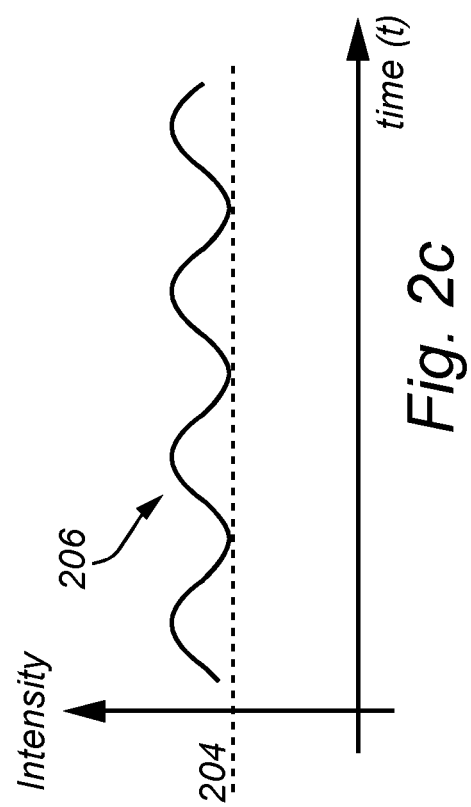
FIG. 2*c* schematically illustrates an exemplary intensity modulation according to an embodiment of the invention.
Figure 2B:
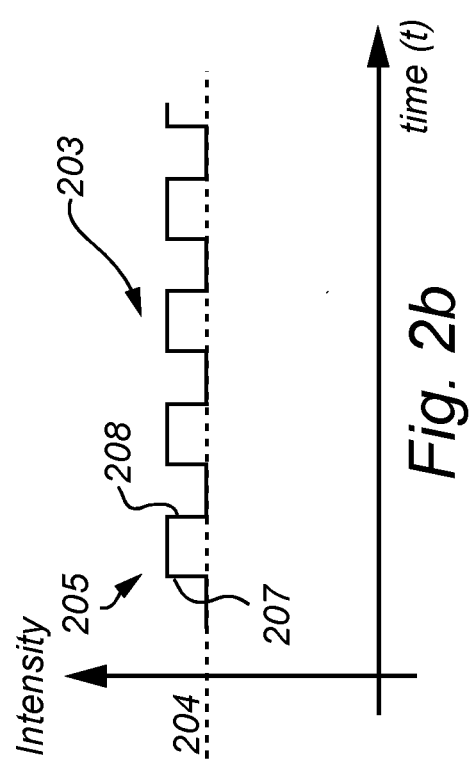
FIG. 2*b* schematically illustrates an exemplary intensity modulation according to an embodiment of the invention.

Alternatively, as illustrated in FIG. 2c, the modulation signal of the light intensity modulation about the static light intensity 204 may be a sine wave modulation with a modulation frequency. Furthermore, the modulation signal may be a PRBS (pseudorandom binary sequence) signal or a random broad band signal (e.g. "noise").

In case of a step-response from the plant, for example with a square-wave light intensity modulated input light u(t), the step responses may be analyzed in terms of a black box model for either the rising 207 or falling 208 edge. The transfer function will be different depending on which edge is chosen which indicates that the modeled system is non-linear. With a black box model the photosynthesis process is modeled by an input u(t), an output y(t) and a transfer function without taking into account the internal process in the plant. A black box model may be described by:

$$y(t)=G(q)u(t)+e(t)$$

where G(q) is the transfer function and expressed in the shift operator q, e(t) is a noise term. The transfer function comprises a plurality of parameters. An exemplary transfer function may be given by:

$$G(q) = \frac{b_1 q^{-1} + b_2 q^{-2} + b_3 q^{-3} + b_4 q^{-4}}{1 + a_1 q^{-1} + a_2 q^{-2} + a_3 q^{-3}}.$$

This exemplary transfer function thus has transfer function parameters $b_1$, $b_2$, $b_3$, $b_4$, $a_1$, $a_2$, and $a_3$. Furthermore, this transfer function has 4 zeros (from the order of the nominator) and 3 poles (from the order of the denominator). For each step response in a series of step responses a transfer function of this kind may be used as a model.

According to one embodiment, the values of the parameters (for example, with the above transfer function, the parameters are $b_1$, $b_2$, $b_3$, $b_4$, $a_1$, $a_2$, and $a_3$) may be used for determining the growth status of the plant. In particular, changes in the parameter values are indicative of the growth status of the plant. For example, changes of the parameter values may be indicative of the level of stress in the plant. Note that if the parameters of a polynomial are known, then also the zeros of that polynomial are known. In case of a transfer function as described above, if the parameters are $b_1$, $b_2$, $b_3$, $b_4$, $a_1$, $a_2$, and $a_3$ are known, then the zeroes and the poles of the transfer function are also known, or at least easily accessible.

Thus, in another embodiment, a change in a position of the poles of the transfer function may be used for determining a growth status of the plant. Naturally, the zeroes and poles follow from the parameter values of the transfer function. For example a change in a position of the zeros of the transfer function may be used for determining a growth status of the plant. In this way a level of stress may be determined from the change in position of a zero and/or a pole of the transfer function. Furthermore, the relative change in position of the poles and/or zeros may be used as an indication of the growth status. For example, if poles and/or zeroes are moved further away from each other between two measurements (determinations of position of poles and/or zeros) may indicate an increased level of stress of the plant.

Figure 3A:
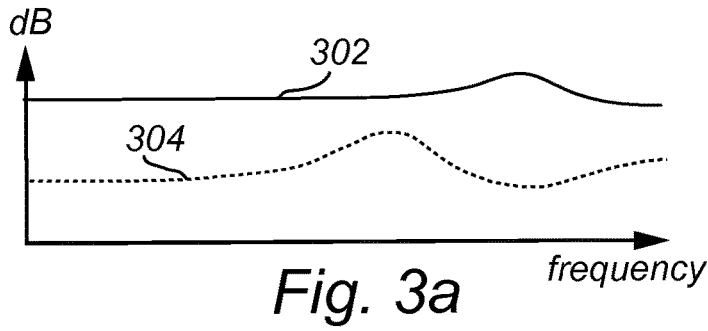
FIGS. 3*a-b* and 4 schematically illustrates exemplary frequency functions according to embodiments of the invention.
Figure 3B:
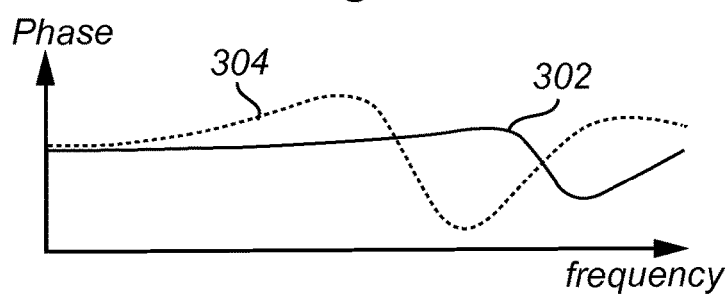
Figure 3C:
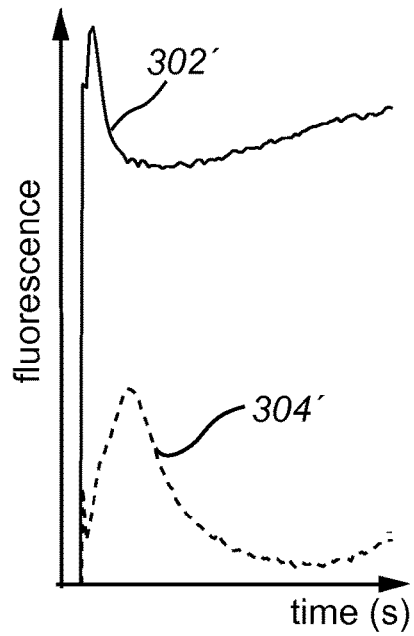
FIG. 3*c* illustrates exemplary step responses of a plant.

Furthermore, in yet another embodiment, the transfer function is studied in the frequency domain in order to determine a growth status of the plant. The frequency domain may be assessed by first replacing the argument q in the transfer function by the exponential $e^{iw}$ where i is the imaginary unit and w is the angular frequency (rad/s). In the frequency domain the dynamics may be studied by for example determining a shift of the transfer function in the frequency domain. For example, acclimation of the plant to a certain light intensity offset may be assessed. FIG. 3a-b show the magnitude and the phase in the frequency domain for transfer functions determined from step responses from two plants being acclimatized to 80 μE 302 and 500 μE 304, respectively. The step response in the time domain is shown in FIG. 3c, for the plant being acclimatized to 80 μE 302' and 500 μE 304' respectively. Both plants were subjected to a 80 μE step increase from the respective acclimatization light intensity (i.e. 80 μE and 500 μE). The plants acclimated to low light intensity (80 μE) thus exhibits faster dynamics than the plants acclimated to higher light intensity (500 μE). Thus as described previously in this patent application, the buffers of the plants acclimatized to the lower light intensity (302) are smaller, thereby a faster dynamics is found in the transfer function compared to the dynamics of the transfer function for the plants acclimatized to the higher light intensity (304) that have developed larger buffers.

Figure 4:
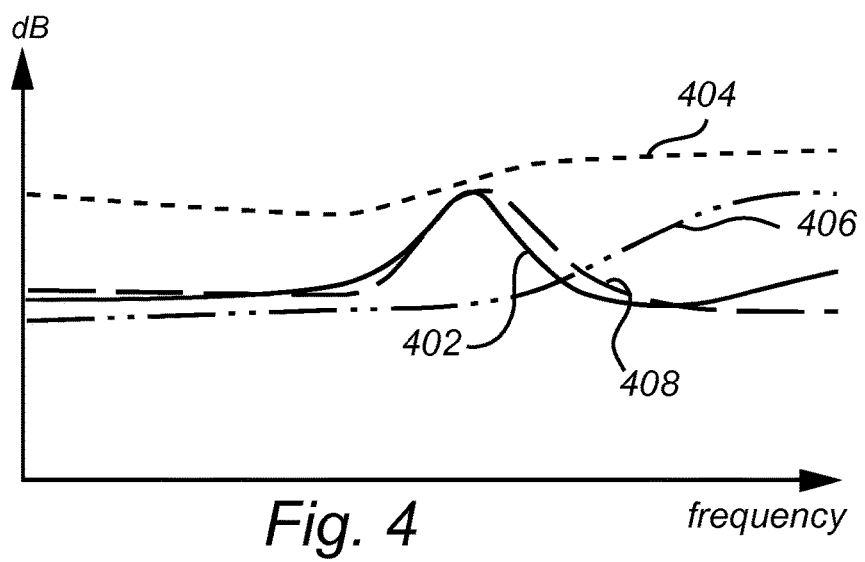

FIG. 4 shows the gain of the frequency function (i.e. the transfer function in the frequency domain) for plants acclimatized to 500 μE in four different light intensities: I: 110 μE (402), II: 530 μE (404), III: 1750 μE (406), and IV: 110 μE (408). The different light intensities are a sequence of offset light intensity settings with the same spectral distribution. Throughout the intensity sequence, the plants were exposed to a light intensity modulation and the modulation signal being a repeating step-increase in light intensity and the step response was measured in order to identify transfer functions in each light intensity. The transfer functions were in this case determined in the frequency domain. As can be seen, the frequency function (i.e. the transfer function gain and phase in the frequency domain) is shifted to higher frequencies with the increased offset light intensity. For example, starting from the function 402 established at 110 μE, the function 404 determined at 530 μE is clearly shifted to higher frequencies which indicates faster dynamics. Furthermore, the function 406 determined at 1750 μE is shifted to even higher frequencies. The flatter curves for 530 μE 404 and 1750 μE 406 indicates less dynamics, normally caused by loss of states, indicating "full" or "empty" buffers. The transfer function 408 determined at recovery of the plant at 110 μE offset light intensity approaches the initial frequency function 402.

The observed behavior of the plants after being exposed to the step function of light intensity modulation is typical for a system consisting of buffers. Thus, the flow of energy (light intensity) in relation to the capacity of utilizing energy (due to acclimatization) determines how fast the system responds to an input signal (input step function). In such a system, the response to an input signal is faster if the flow through the system is increased. In addition, the response is faster for a buffer system with smaller volumes, i.e. a system with lower capacity compared to a system with higher capacity. Furthermore, if the capacity of one or more buffers in the system is reached, the system loses states. Such a loss corresponds to a loss in complexity and system order. This may be seen by pole-zero cancellation occurring when e.g. the light intensity is higher compared to the plant capacity. By introducing a feedback into the buffer system, resonance peaks will appear in the frequency function. Thus, the mechanism behind the response of the plants may be described as a buffer system with feedback.

For determining the growth status of the plant 102, the transfer function may be determined each time, or only once. For example, with a predetermined transfer function either another transfer function is determined with a different offset light intensity or spectrum, different light intensity modulation or a different modulation signal about the offset, and compared with the previous transfer function to investigate whether the dynamics have changed, thereby the growth status. Alternatively, with a transfer function only determined a first time as a predetermined transfer function, only a single frequency or possibly a few frequencies may be used an input light. For example, as shown in FIG. 2c, with a single frequency the input light intensity is modulated as a sine signal 206 about the known offset light intensity 204. With only a single modulation frequency in an input light, an entire transfer function (i.e. for more frequencies than the input frequency) may not be determined but the dynamics of the fluorescence at the single modulation frequency may be used instead. In this situation, the gain and phase determined from the detected light at the signal frequency may be compared with the gain and phase of the predetermined transfer function at that modulation frequency. Alternatively or additionally, a single frequency may used for two determinations of phase and gain, and the two gains and/or phases are compared to each other in order to determine the status of the plant.

Figure 5:
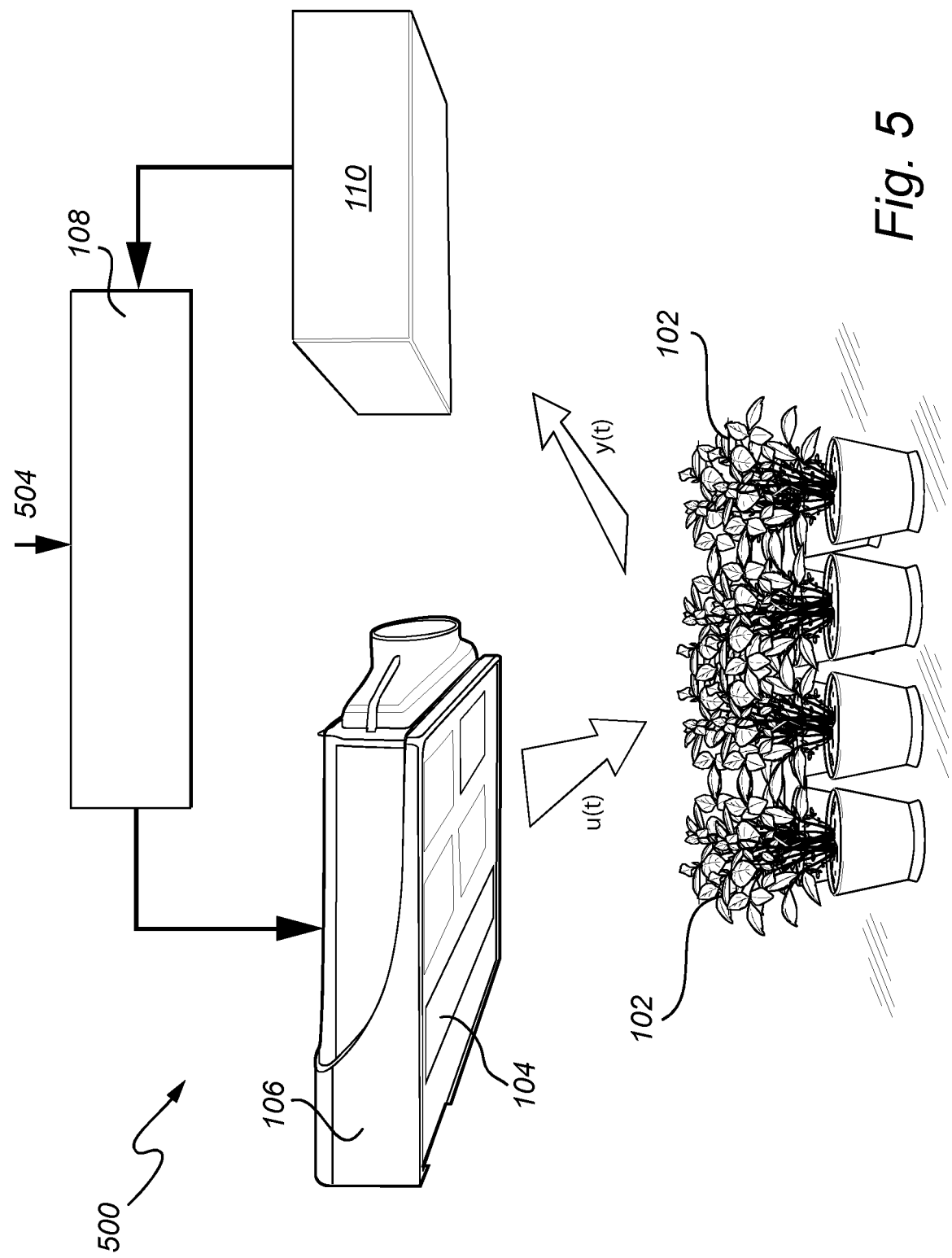
FIG. 5 schematically illustrates an exemplary embodiment of the invention.

FIG. 5 shows an exemplary system 500 according to an embodiment of the invention. In FIG. 5, a light-emitting device 104 is arranged to irradiate plants 102. A light sensor 110 is arranged to detect light emitted from the plant. The light u(t) illuminating the plants is emitted by the light-emitting device 104 but may also comprise ambient light. The input light u(t) may comprise a offset light component and a time-varying light component overlaid with the offset light. Furthermore, detected offset light may comprise ambient light. Furthermore, in alternative embodiments, the emitted light may not comprise offset light, thus the detected offset light may comprises only ambient light. The detected light is denoted y(t). The detected light comprises fluorescence from the plant; light outside the fluorescence spectrum may be filtered away. The light intensity modulation may comprise light wavelengths only away from the fluorescence wavelength, thereby facilitating detection of the fluorescence light since the wavelength of reflected light is away from the wavelengths of the fluorescence light. Furthermore, a control unit 108 is arranged to receive a signal from the sensor 110, the signal y(t) contains information (spectral composition, intensity, etc.) about the detected light. The control unit 108 is further arranged to control the output light u(t) emitted towards the plants. For example, the control unit may control the light emitting devices 104 of the lighting arrangement 106, or the control unit may control blocking means for blocking ambient light such as sun light. The system is arranged as a feedback system with an input 504 to the control unit 108. The input 504 may be related to a desired growth status of the plant which a user may request. For example, it may be desirable to grow a plant having certain properties at given time, e.g. a completed growth cycle on time for delivery, or a certain stem size of the plant, or any of the previously described properties. The control unit 108 receives the signal y(t) corresponding to the detected light, and with knowledge of the input light u(t), the control unit determines a transfer function (e.g. transfer function G). From the transfer function, a growth status of the plant is determined by analyzing parameters of the transfer function, poles and/or zeros of the transfer function, or a frequency and/or a phase of the transfer function in the frequency domain. The control unit 108 compares the determined growth status with the input 504 desired growth status. The control unit 108 further keeps track of offset light intensity/spectrum, light intensity modulation amplitude/spectrum and properties of the modulation signal such as amplitude/spectrum, signal form and also the detected phase of the signal form. Depending on the correspondence or difference between the desired growth status and the determined growth status, the control unit may control a property of the input light u(t) such as to modulate the growth of the plants 102. For example, if it is determined that the plant 102 is stressed, the light emitted towards the plant for growing the plants may have to be modulated. It may for example occur that the plants 102 are acclimatized to a different light intensity that what is presently emitted to the plants. Furthermore, it may be determined if the plant are stressed in general, for example as a result of an unfavorable temperature in the surroundings of the plants 102, or deviating watering, or $CO_2$ levels. Furthermore, the spectral composition, amplitude or modulation frequency of the light may be tuned for optimal growth. Additionally or alternatively, the control unit may keep track of the growth state of the plant. By knowing the growth state an even more accurate way of determining the growth status is possible.

Figure 6:
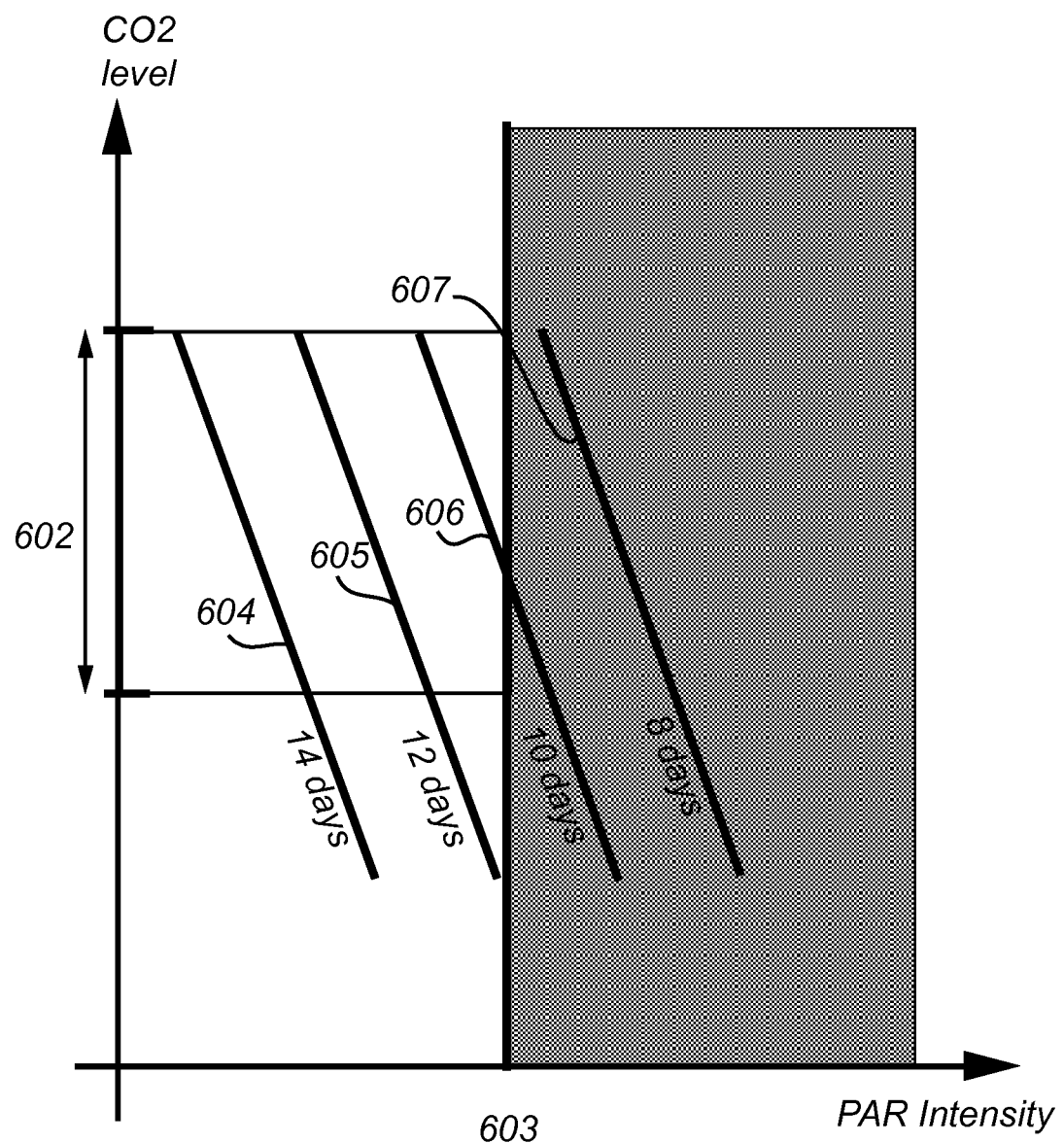
FIG. 6 schematically illustrates an exemplary embodiment of the invention.

Thus, it is possible to adjust the growth status during a growth cycle. In particular the desired growth status may be adjusted in relation to a desired growth cycle end date. For example, in case a request is made to complete the growth cycle in a shorter (or longer) time (e.g. due to a changed demand), a different regime for growing the plants may be implemented, where the plants thus may be grown in a faster (or slower) manner. In such a case, it may first be established a target delivery date and thereafter an estimated required production rate in order to meet the delivery date. Next, depending on the acclimatization of the plant, e.g. using the procedure described with reference to FIG. 3a-b may be used to determine the maximum PAR (photosynthetically active radiation) intensity which may be used for growing the plants. Subsequently, the maximum PAR may be used together with possible $CO_2$ levels in order to determine the soonest possible delivery. FIG. 6 illustrates a graph of $CO_2$ level versus PAR intensity, for example in a greenhouse 104. On the y-axis, there is indicated a possible span 602 of $CO_2$ levels and on the x-axis there is indicated a maximum tolerated PAR 603 for the plant 102. The possible span of $CO_2$ levels may be limited by greenhouse properties or other technical limitations, or by the growth of the plants. The isocurves 604-607 indicate production rate curves for reaching a respective delivery time. For example, isocurve 604 may represent a delivery in 14 days, isocurve 605 may represent a delivery in 12 days, isocurve 606 may represent a delivery in 10 days and isocurve 607 may represent a delivery in 8 days. For example, if a known target delivery date is established, and thereafter a required production rate a corresponding isocurve may be found. From a determined maximum PAR intensity, it may be evaluated if the delivery date may be met, or what level of $CO_2$ is needed to meet the delivery. In the illustrated exemplary graph, the 8 day delivery isocurve is outside the possible span of $CO_2$ and beyond the maximum tolerated PAR for the plant 102, therefore an 8 day delivery is not possible to meet. However, the 12 day isocurve is partly inside the possible span of $CO_2$ and within the maximum tolerated PAR 603, thus a delivery in 12 days is possible to meet.

Figure 7:
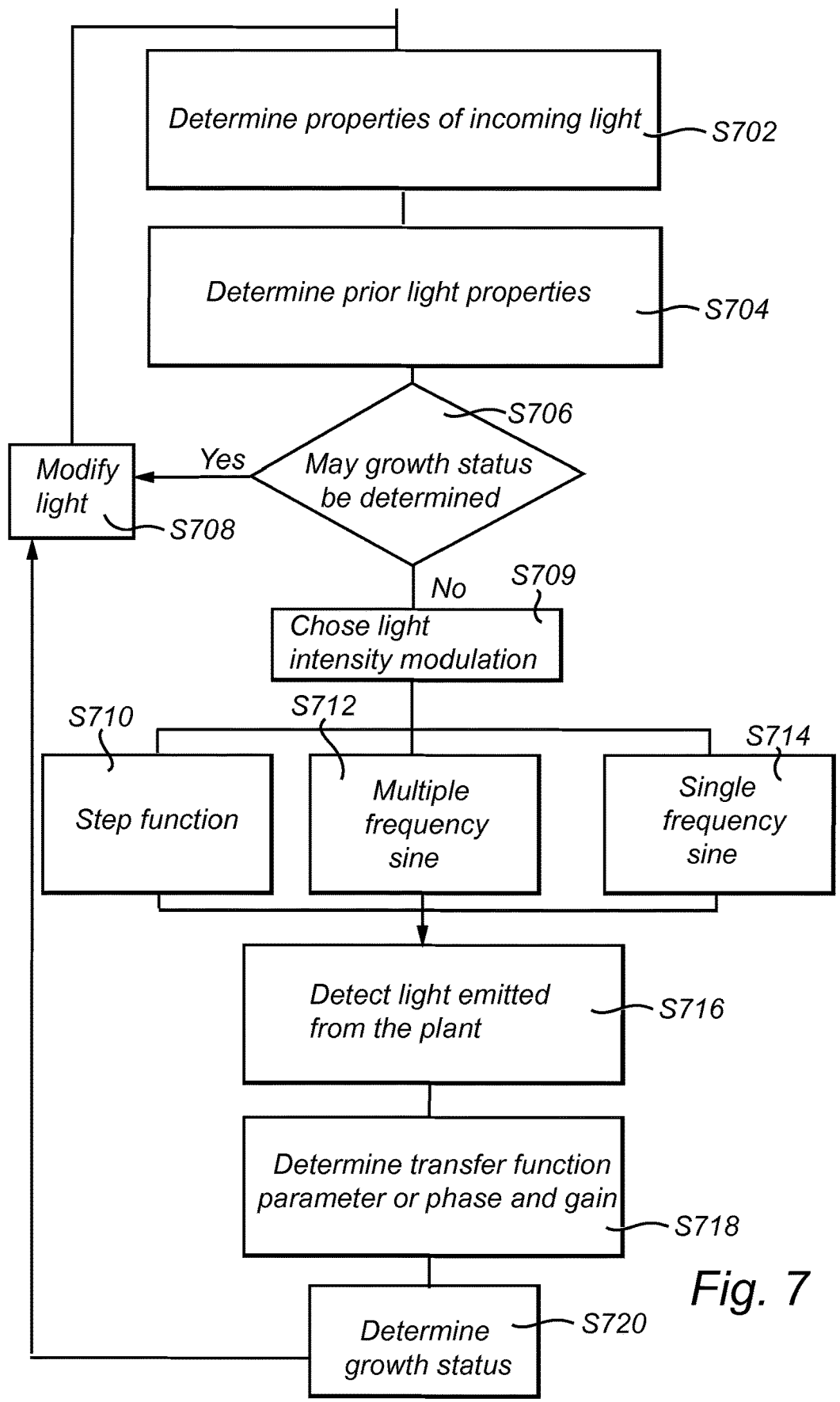
FIG. 7 provides a flow-chart of method steps of an exemplary embodiment of the invention.

FIG. 7 provides a flow-chart with method steps according to an exemplary embodiment of the invention. The flow-chart describes the steps for determining a growth status for a plant 102 via determining e.g. a parameter of a transfer function, a gain, or a phase of transfer function. In a first step S702, properties of incoming light towards the plant are determined. For example, the properties may be offset light intensity and/or the offset light spectrum. Optionally S704, light properties which the plant was subjected to prior to the determining of the present growth status are determined. It may now be evaluated S706 if the prior light properties together with the present properties determined in step S702 are sufficient for determining the growth status. For example, the offset light intensity may be too high (or too low) such that the plant is stressed at the present time. In such situation, the offset light intensity may be lowered and the growth status may be determined in normal offset light intensity where the plant is allowed to acclimatize and thus not be stressed with respect to light (but possible with respect to e.g. nutrition, watering, etc). As a further example, if the surrounding light is not stable enough, it may not be possible to obtain a usable evaluation of the plant growth status, thus the offset light intensity need to be stabilized.

Furthermore, if the offset light intensity has been stable for a long time (e.g. days) it may be possible to know that the plant is adapted to that offset light intensity. If the growth status may be determined from the prior light properties together with the present properties, the offset light may be modified S708 (e.g. modify intensity of spectrum) in order to modulate growth if needed and the method return to step S702. Furthermore, the method may determine to return to step S702 or to proceed to the subsequent steps depending on in which growth state the plant is. For example, if the plant is in the "termination state" it may not be useful to determine the growth status, whereas if the plant is in the "flowering state" it may be highly relevant in order to optimize the growth of the plant 102. After step S706, if further evaluation is needed, the invented method may be used to perform the following steps. First, a light intensity modulation is chosen S709 including the amplitude and/or the spectrum of the light intensity modulation. Subsequently, a modulation signal is chosen, for example, the plant may be illuminated S710 with a light intensity modulation in the form of a step-up 207 or step-down 208 (i.e. a broad band signal). Alternatively, a sine modulation signal with multiple modulation frequency S712 (e.g. convolution of sweeping) or a single frequency modulation is used S714. Subsequently, light emitted from the plant 102 is detected S716. In the detection step S716, the phase of the modulation signal is taken into account. For example, if the modulation signal is a square wave, it is relevant to measure on the same edge (falling or rising) in order to be able to compare transfer functions, or if the modulation signal is a sine signal, the detection is performed at the same phase each time. The light comprises a response of the plant to the input light. For example, the detected light comprises fluorescence from the plant 102. Based on the detected light and knowledge about transfer functions of the plant in specific light settings (e.g. offset light intensity/spectrum, light intensity modulation amplitude/spectrum and properties of the modulation signal such as amplitude/spectrum, signal form and also the detected phase of the signal form) having specific light properties, transfer function parameters or phase and gain are determined S718. From the transfer function parameters or phase and gain, the growth status is determined S720 by comparing this to the previously determined transfer functions or phase and gain which were determined in known growth status and light properties. The method may now return to step S702 if other light settings or environmental conditions (e.g. CO2 levels, watering, etc) are to be evaluated. The method may further proceed to step S708 if the light need to be modified in order to modulate growth, subsequently the method returns to step S702.

Figure 8:
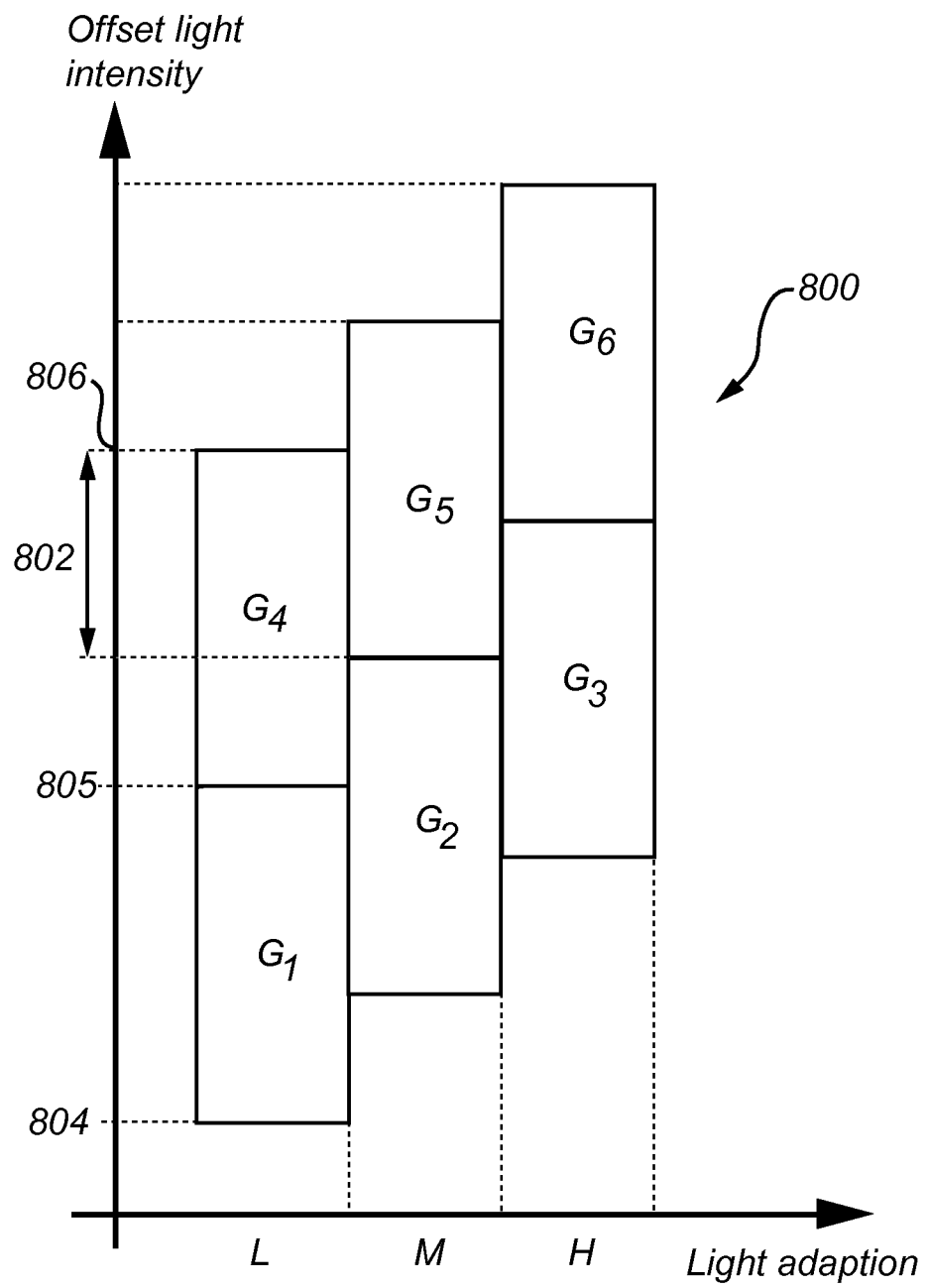
FIG. 8 illustrates an exemplary table of transfer functions mapped with offset light intensity.

FIG. 8 shows an exemplary table of transfer functions dependent on the level of light adaptation on the x-axis (or the level of stress) and the offset light intensity on the y-axis. Note that the levels of light adaptation are divided into Low (L, low adaption level), Medium (M, medium adapted), and High (H, highly adapted) in correspondence with the boxes (with the respective transfer function ($G_1$, $G_2$, $G_3$ $G_4$, $G_5$, $G_6$)). The boxes indicates within which range of light adaptation (L, M, H) and within which range of offset light intensity the respective transfer function ($G_1$, $G_2$, $G_3$ $G_4$, $G_5$, $G_6$) is valid. For example, if a determined transfer function is $G_4$, it may be concluded that the plant is "Medium" light adapted (or at the corresponding stress level). Alternatively or additionally, if a determined transfer function is $G_5$ it may be concluded that the plant is at a "Medium" light adaptation level and that the offset light intensity is within the range 802. As a further example, the transfer function $G_1$ may correspond to a "Low" level of light adaptation and within the range from 804 to 805 being for example from 80 μE (804) to 250 μE (804), the upper offset light intensity level 806 of transfer function $G_4$ may for example be 500 μE (806). Note that similar tables as the one shown in FIG. 8 may be obtained for other growth properties such as water levels, nutrition levels, CO2 levels, etc with corresponding transfer functions.

The below table non-exhaustively summarizes factors that affects the transfer function and its parameters. For example, a variation in either the spectrum or the overall intensity of the offset light affects the parameters of the transfer function. The type of modulation of the input light affects the transfer function as well as the intensity (i.e. total amplitude of the modulation, or the combination of the offset intensity and the modulation amplitude) and the spectrum of the modulated input light. The modulation type may be a broad band signal such as one of a step pulse, a PRBS (pseudorandom binary sequence) signal, and a square-wave. However, the input light may comprise any arbitrary waveform having a specific range of frequency components and may also have a specific phase. The broad band signal may comprise frequency content in the range of 0.001-100 rad/s or even higher such as up to 1000 rad/s.

| Transfer function | | | | |
|---|---|---|---|---|
| Offset light | | Light intensity modulation | | |
| Intensity | Spectrum | Modulation signal | Intensity | Spectrum |

The control unit 108 may be analogue or time discrete, include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description.

There is further provided a computer program product for controlling a control unit to execute the steps of illuminating the plant with input light including a light intensity modulation component; detecting light emitted from the plant; determining an offset light intensity surrounding the plant, the offset light intensity being a static component of the input light; determining a phase and a gain between the input light and the detected light; determining a growth status of the plant based on a predetermined relationship between input light and detected light, and on the phase and the gain.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The control unit is preferably a micro processor or any other type of computing device. Similarly, the computer readable medium may be any type of memory device, including one of a removable nonvolatile/volatile random access memory, a hard disk drive, a floppy disk, a CD-ROM, a DVD-ROM, a USB memory, an SD memory card, or a similar computer readable medium known in the art.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining a growth status of a plant comprising chlorophyll, said method comprising the steps of:
    illuminating said plant with input light including a light intensity modulation component;
    detecting fluorescent light emitted from said plant;
    determining an offset light intensity surrounding the plant, said offset light intensity being a static component of said input light;
    determining a phase and a gain between said input light and said detected light; and
    determining a growth status of said plant based on a predetermined relationship between input light and detected light, and on said phase and said gain.

2. The method according to any one of claim 1, wherein said offset light intensity is non-zero.

3. The method according to claim 1, wherein said step of determining said offset light intensity comprises at least one of:
    measuring said offset light intensity;
    controlling said offset light intensity by controlling artificial light emitted by light emitting devices; and
    determining a growth status of said plant, associating said determined growth status with a predefined offset light intensity.

4. The method according to claim 1, wherein said light intensity modulation component is a cyclic modulation signal having a repetition frequency.

5. The method according to claim 1, further comprising selecting a spectral distribution for said light intensity modulation component based on a spectral distribution of said offset light intensity.

6. The method to according to claim 1, wherein a spectral distribution of said modulation component and/or a spectral distribution of said static component excludes a fluorescence wavelength of said plant.

7. The method according to claim 1, wherein said predetermined relationship is a transfer function comprising a set of transfer function parameters, determined by the steps of:
    illuminating said plant with input light having a light intensity modulation component having multiple modulation frequencies;
    detecting light emitted from said plant;
    determining said set of transfer function parameters using a system identification method.

8. The method according to claim 7, further comprising determining a set of predetermined transfer functions for mapping growth status and input light.

9. The method according to claim 7, wherein said transfer function is determined for a known offset light intensity, and a known light intensity modulation.

10. The method according to claim 1, wherein said light intensity modulation component has multiple modulation frequencies, said method further comprising determining a detected transfer function between said input light and said detected light comprising transfer function parameters, wherein said phase and said gain are determined from said detected transfer function.

11. The method according to claim 10, wherein said step of determining said growth status comprises determining a change of said parameter values compared to parameter values of said predetermined transfer function, wherein said change is indicative of the level of stress in said plant.

12. The method according to claim 1, wherein said light intensity modulation component is a modulation signal with frequency content in the range of 0.001-100 rad/s.

13. The method according to claim 1, wherein said light intensity modulation component is selected from a pseudo-random binary sequence (PRBS) signal and a random broad band signal.

14. The method according to claim 1, wherein depending on the determined phase or gain between said input light and said detected light, controlling said offset light intensity to modulate a property of said phase or said gain.

15. A method for controlling the growth of a plant, said method comprising the steps of claim 1 and further the step of:

based on said determined growth status and on a desired growth status for said plant, controlling a property of said input light to modulate the growth of said plant towards said desired growth status.

\* \* \* \* \*

UNITED STATES PATENT AND TRADEMARK OFFICE
CERTIFICATE OF CORRECTION

PATENT NO. : 10,750,671 B2  
APPLICATION NO. : 15/541575  
DATED : August 25, 2020  
INVENTOR(S) : Torsten Wik, Anna-Maria Carstensen and Tessa Pocock Page 1 of 1

It is certified that error appears in the above-identified patent and that said Letters Patent is hereby corrected as shown below:

On the Title Page

Item (87), PCT Pub. Date, delete "Jun. 21, 2016" and replace with --Jul. 21, 2016--

Signed and Sealed this
Twenty-fourth Day of November, 2020

Andrei Iancu
*Director of the United States Patent and Trademark Office*